United States Patent
De Winter et al.

(10) Patent No.: US 6,724,163 B2
(45) Date of Patent: Apr. 20, 2004

(54) LOW PIN COUNT DC-MOTOR INTEGRATED DRIVE CIRCUIT

(75) Inventors: Rudi De Winter, Heusden-Zolder (BE); Brad Marshall, Dumbarton, NH (US); Vincent Hiligsmann, Chenee (BE); Francois-Pierre Laulanet, Brussels (BE)

(73) Assignee: Melexis NV, Ypres (BE)

( * ) Notice: Subject to any disclaimer, the term of this patent is extended or adjusted under 35 U.S.C. 154(b) by 0 days.

(21) Appl. No.: 09/969,289

(22) Filed: Oct. 1, 2001

(65) Prior Publication Data

US 2002/0093307 A1 Jul. 18, 2002

Related U.S. Application Data

(63) Continuation of application No. 09/444,550, filed on Nov. 22, 1999, now Pat. No. 6,300,736.
(60) Provisional application No. 60/128,675, filed on Apr. 9, 1999.

(51) Int. Cl.[7] ................................................. H02P 6/08
(52) U.S. Cl. ........................ 318/254; 318/504; 318/721
(58) Field of Search ................................ 318/138, 254, 318/439, 720, 721, 722, 723, 724, 504; 388/907.5

(56) References Cited

U.S. PATENT DOCUMENTS

| 3,864,610 | A | * | 2/1975 | Kawamoto et al. | 318/254 |
|---|---|---|---|---|---|
| 4,656,553 | A | * | 4/1987 | Brown | 361/31 |
| 5,847,524 | A | * | 12/1998 | Erdman et al. | 318/439 |
| 5,947,691 | A | * | 9/1999 | Brown et al. | 417/44.1 |
| 5,952,798 | A | * | 9/1999 | Jones et al. | 318/268 |
| 6,150,779 | A | * | 11/2000 | Itami et al. | 318/254 |
| 6,169,378 | B1 | * | 1/2001 | Karwath | 318/254 |
| 6,188,187 | B1 | * | 2/2001 | Harlan | 318/254 |

* cited by examiner

*Primary Examiner*—Bentsu Ro
(74) *Attorney, Agent, or Firm*—Gerald T. Gray, Esq.; Townsend and Townsend and Crew LLP

(57) ABSTRACT

A DC motor drive circuit, includes a switching circuit that drives the coils of a small permanent magnetic DC motor. The drive circuit is preferably implemented in an integrated circuit device, such as a silicon CMOS device. Integrated into the same integrated circuit device is a magnetic sensor arranged to detect the position of the permanent magnet as it passes a defined point, or points, in its revolution, and control circuitry to derive the timing waveforms for driving the coils. The integrated power devices for driving the coils are also arranged to limit the rise and fall times of the applied voltages and currents so as to reduce or eliminate the generation of unwanted RFI. Additional circuitry is also integrated into the same integrated circuit device to derive the necessary power to operate the magnetic sensor, the control circuitry and the switching circuitry from the connections between the switching circuitry and the coils so as to remove the need for a separate power supply connection.

21 Claims, 2 Drawing Sheets

LOW PIN COUNT DC-MOTOR INTEGRATED DRIVE CIRCUIT

CROSS REFERENCES TO RELATED APPLICATIONS

This application is a continuation of application Ser. No. 09/444,550, filed Nov. 22, 1999, now U.S. Pat. No. 6,300,736 B1 which claims benefit of application Ser. No. 60/128,675 filed Apr. 9, 1999.

BACKGROUND OF THE INVENTION

The present invention relates generally to the operation of small, low-cost DC motors, and more particularly to sensing and switching circuits needed to sequentially power the coils of the motor in synchronism with the movement of the rotor.

Small, low-cost dc motors are used in a large number of low-power and battery operated equipment. For example, such DC motors are often used as motors for continuous operation fans. In such applications the reliability and safety of the equipment is dependent upon the performance and reliability of the fan motor. Such motors are therefore key to the continuous availability of the equipment. An example is a fan in a personal computer. A fan in the body of the computer carries out an essential function by cooling the main processor unit, thereby protecting it from damage caused by overheating. The costs of personal computers have been subject to considerable price erosion, and a low-cost, but highly reliable, fan drive circuit is an essential part of such equipment.

DC motor drives typically contain a magnetic sensitive device for detecting the position of a permanent magnet rotor of the motor, and switching circuitry to switch the voltage from coil to coil to maintain the rotation. However, additional circuit components must usually be present to reduce the radio frequency interference, RFI, generated by the switching process so as to protect the switching and measuring circuits from transients and interference. Further, additional circuitry must be present to supply a suitable voltage power supply to the measurement circuitry and to protect against a reversal of the power supply feed and additional Electro-static discharges, ESD, associated with static build up and handling hazards.

SUMMARY OF THE INVENTION

According to the invention, a DC motor drive circuit includes a switching circuit that drives the coils of a small permanent magnet DC motor. The drive circuit is preferably implemented in an integrated circuit device, such as a silicon CMOS device. Integrated into the same integrated circuit device is a magnetic sensor arranged to detect the position of the permanent magnet as it passes a defined point, or points, in its revolution, and control circuitry to derive the timing waveforms for driving the coils. The integrated power devices that drive the coils are also arranged to limit the rise and fall times of the applied voltages and currents so as to reduce or eliminate the generation of unwanted RFI.

Additional circuitry is also integrated into the same integrated circuit device to derive the necessary power to operate the magnetic sensor, the control circuitry and the switching circuitry from the connections between the switching circuitry and the coils so as to remove the need for a separate power supply connection. Deriving the power necessary to operate the electronic circuitry in this manner has the additional benefit that the inherent inductance and capacitance of the coils and motor acts both as a natural suppression for ESD transients and also as a current limitation device in the event of inadvertent power supply reversal or transient surge in the power supply which would normally cause destructive damage. The output drivers are also preferably protected by zener diodes to add surge and transient protection. The integrated circuit design takes advantage of these inherent benefits and includes circuit elements designed to ensure that expected ESD transients and reverse and over voltage transient power supply connections can be survived without damage to the device or deterioration in its performance.

In one embodiment of the invention, the magnetic detection element includes a Hall effect device, and two coils that are used to drive the motor. In this embodiment, the complete switching and control circuit needs only three connections and can be mounted in an industry standard, low-cost three-pin package.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 4:
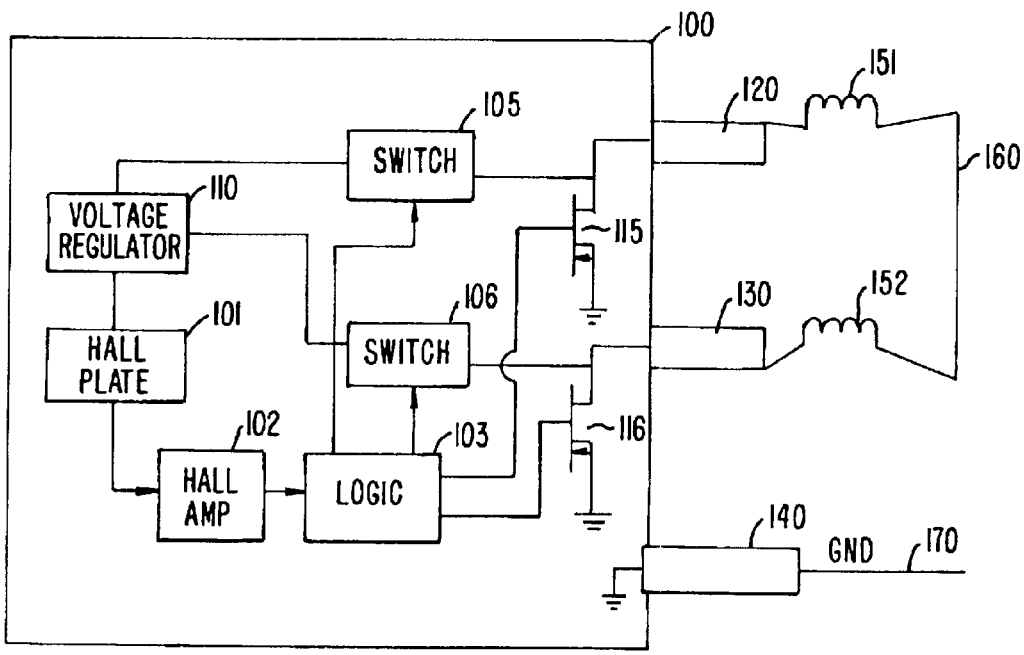
FIG. 4 is a block diagram illustrating the circuit elements and the connections between the electronic three-pin package, the motor coils and the power supply feed according to an embodiment of the present invention.

FIG. 4 shows a schematic arrangement of the functional elements of the integrated circuit 100 according to an embodiment of the present invention. The DC motor is represented by first and second coils 151 and 152, which are driven by first and second low-power transistors 115 and 116, respectively. Low-power transistors 115 and 116 are driven alternately on and off in anti-phase so as to keep the permanent magnet rotor of the DC motor turning. The switching of low-power transistors 115 and 116 is controlled by control logic circuit 103. Control circuit 103 can be implemented in a number of ways dependant upon the characteristics of the motor, the drive transistors 115 and 116 and the environment. In one embodiment, the drive transistors need only to be the inverse of one another. In this embodiment, control circuit 103 includes an inverter. In an alternate embodiment, control circuit 103 includes a bistable latch circuit wherein such drive transistors 115 and 116 are connected to two points within the circuit which are always in different states such that one drive transistor is off when the other is on. Additional circuitry may be included, for example to ensure that the two drive transistors 115 and 116 can never both be in the on state simultaneously. In one embodiment, a zener diode is included between the drain and gate of each transistor 115 and 116 to add surge and transient protection. In preferred aspects, the transistors are N-channel MOS transistors.

The switching of coils 151 and 152 is synchronized with the rotor by means of a magnetic sensing device. In a preferred embodiment, the magnetic sensing device comprises a Hall plate 101 and an associated Hall amplifier 102 as shown in FIG. 4. Hall plate 101 and Hall amplifier 102 are arranged in a well known configuration such that the output of amplifier 102 is switched between two defined states by the action of an imposed magnetic field. When the magnetic field exceeds a first threshold value, Hall amplifier 102 creates an output in a first state. When the magnetic field falls below the first threshold, Hall amplifier 102 continues in the first state. When the magnetic field reverses and then exceeds a second threshold value in this reversed direction, Hall amplifier 102 switches and creates a second output state. Hall amplifier 102 continues in the second state until the magnetic field reverses again to the first direction and also again exceeds the first threshold. The action of Hall plate 101 and amplifier 102 is that of a latch which is set to a first state by a sufficient field in the first direction and reset to a second state by a sufficient field in the reverse direction. Such reversing fields are present in DC motors when the permanent magnet rotor rotates. Careful mounting of the integrated circuit in close proximity to the motor and in a correct arrangement relative to the positions of the coils enables the circuit to time the switching of the coils so as to reverse the magnetic field of the coils and maintain the rotary movement of the DC motor.

Figure 5:
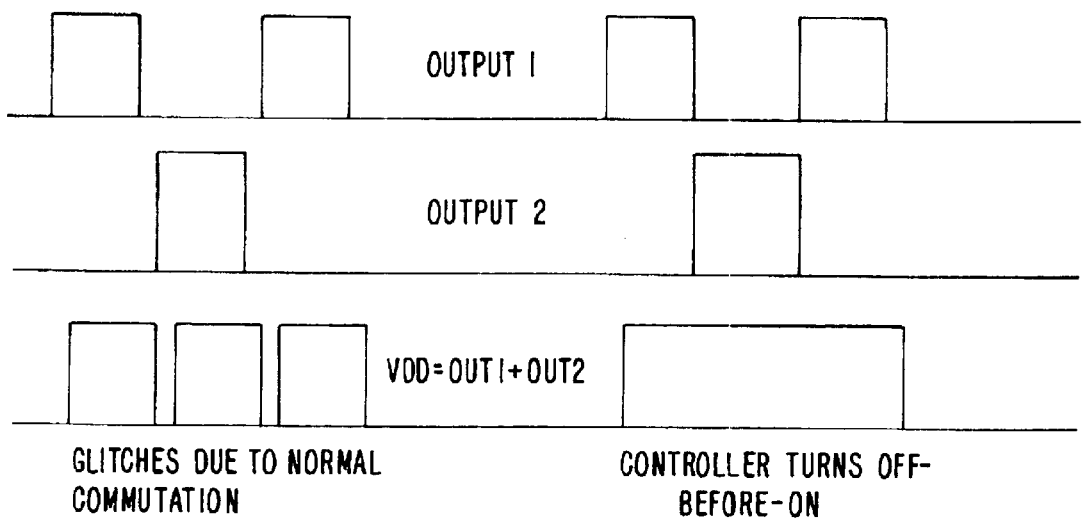
FIG. 5 illustrates waveforms for the coil drives and also the derived internal supply voltage for the circuitry according to an embodiment of the present invention.

The output of Hall amplifier 102, being a signal in one of two states dependant upon the excursions of the magnetic field, is passed from Hall amplifier 102 to control circuit 103. Control circuit 103 determines the correct phasing of the signals passed to the output transistors 115 and 116 so as to maintain the rotation of the motor. In one embodiment, as discussed above, control circuit 103 includes anti-crossover circuitry to prevent both drivers (e.g., transistors 115 and 116) from being on simultaneously. Control circuit 103 generates timing signals that drive switches 105 and 106, which connect or disconnect output pins 120 and 130, respectively, to voltage regulator 110. As shown, voltage regulator 110 is preferably integrated with integrated circuit 100, however, it may be connected to integrated circuit 100 as a separate device. Switches 105 and 106 are controlled by control circuit 103 so as to only connect an output pin to voltage regulator 110 when the voltage on the pin is high, which occurs when the respective output transistor is switched off. Voltage regulator 110 supplies a stabilized voltage to the integrated circuitry comprising Hall plate 101, Hall amplifier 102 and control circuit 103. It follows that for continuity of voltage supply from voltage regulator 110 to the integrated circuitry, the timing of the switching of the output transistors, 115 and 116, and the switches, 105 and 106, needs to be in a proper relationship, such as shown in FIG. 5, which illustrates waveforms for coil drives 151 and 152 and also the derived internal supply voltage for the circuitry according to an embodiment of the present invention.

When the voltages on output pins 120 and 130 are such that neither is high, the voltage on voltage regulator 110 will be low. When, however, the timing is re-aligned so that at least one of output pins 120 and 130 is always high, the voltage on voltage regulator 110 will be constant.

Figure 1:
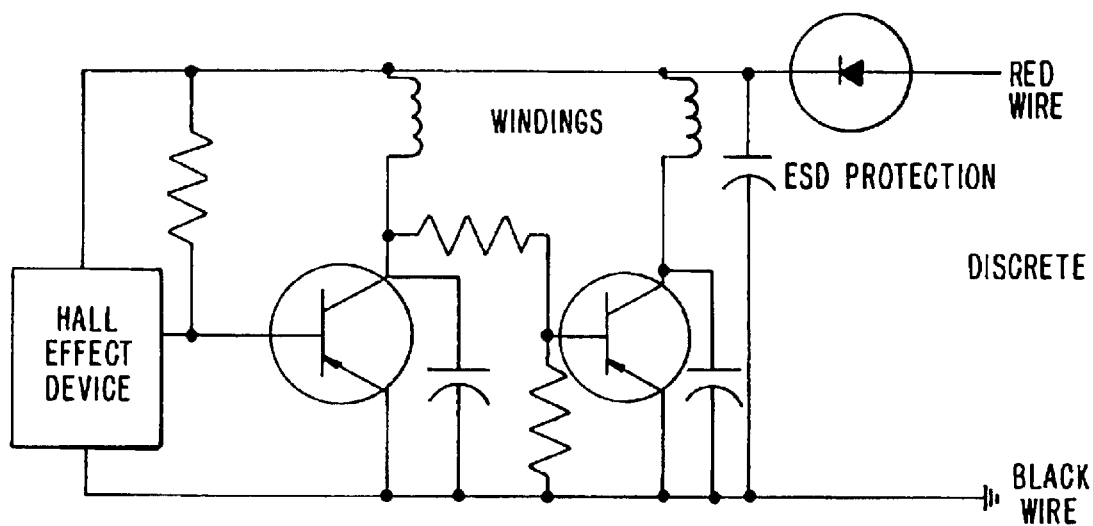
FIG. 1 shows a circuit including a position sensing device, power transistors for driving the coils of a motor, and additional components for reducing RFI and protecting the circuit against ESD and reverse power supply.
Figure 2:
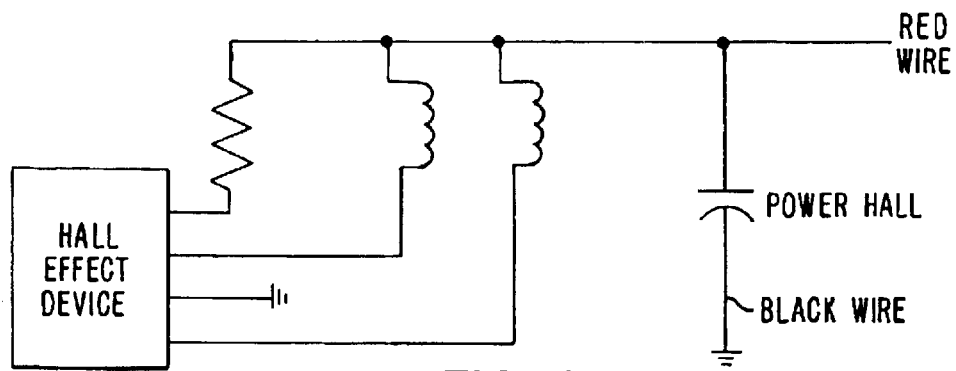
FIG. 2 shows a circuit arrangement including a Hall Effect device with integrated power transistors as both the sensing and switching circuitry.
Figure 3:
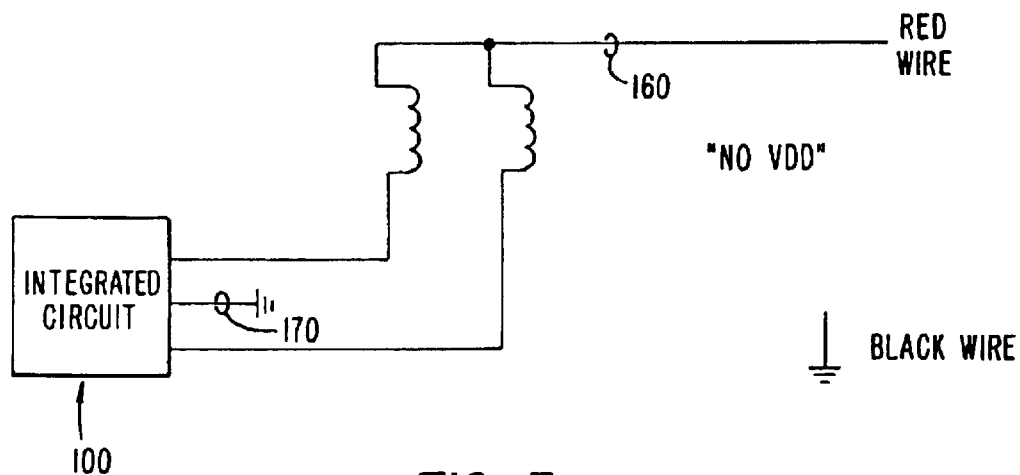
FIG. 3 shows a circuit arrangement including all the external components integrated into a single CMOS device according to an embodiment of the present invention.

Preferred connections can be seen in FIG. 3 and FIG. 4. The negative, or ground, supply 170 is connected directly to integrated circuit 100 via pin 140, and serves as the negative or ground supply for the electronics on integrated circuit 100. Ground supply 170 carries the currents from coils 151 and 152 of the motor. Output pins 120 and 130 are connected to motor coils 151 and 152, respectively, so that the motor rotation is maintained by the switching of the coils in response to the changes in magnetic field. The positive voltage supply 160 is connected to the common point of the two drive coils 151 and 152.

It will be appreciated that integrated circuit 100 is preferably mounted in close proximity to the motor so that the magnetic sensor can detect the magnetic field generated by the rotor. In one embodiment, the mounting arrangement is such that the connections between the pins 120 and 130 and the coils 151 and 152 are non-accessible to external contact. Such an arrangement eliminates damage due to ESD on the output transistors 115 and 116 by making casual contact impossible.

It will be further appreciated that if supply voltage 160 exceeds the normal operating voltage due to transients, the inductance and capacitance associated with coils 151 and 152 will be such as to dissipate, partially or entirely, the energy in the transients before they reach integrated circuit 100. This effect reduces or eliminates the voltage survival requirements on integrated circuit 100. If voltage supply 160 is reversed in polarity relative to the ground 170, the maximum reverse current that can flow in integrated circuit 100 is limited by the impedance of coils 151 and 152 to a value close to the normal operating current when the polarity is correct. This limited reverse current is handled by the output transistors 115 and 116 without damage.

While the invention has been described by way of example there are other features that are well known to those skilled in the art that can also be included in the circuitry as additional features without changing the invention. By way of illustration and example, additional functionality can be implemented in control circuit 103 to vary the ratio of on and off states of the power transistors such as to control the speed of the fan. Such control can be responsive to one or more of several possible signals. In one embodiment, one such signal includes an additional signal communicated to control circuit 103 from an additional connection to the chip. In another embodiment, one such signal includes a signal from an on- or off-chip temperature sensor such as to arrange an increase in fan speed when the temperature increases (or a decrease in fan speed, or shut off, when the T decreases). In yet another embodiment, one such signal includes a signal from a comparitor circuit which compares the actual motor speed derived from the switching signals or the hail effect device signals with an on- or off-chip preprogrammed reference signal or an externally applied reference signal.

By way of further illustration the signals present within the integrated circuit can be used to determine a 'tachometer' or 'speed' signal representing the motor speed for transmission to an external circuit. For example, this additionally derived signal can be in the form of an analogue representation of speed, a digital pulse train representing speed, or a digitally coded signal more suitable for processing by a microprocessor. This signal can be transmitted from the integrated circuit 100 by any suitable means including additional connections or by any well know method of current modulation of the supply current during periods of time when both transistors 115 and 116 are in the off state. Such a speed signal has the additional benefit of enabling external circuitry to determine not just the motor speed but also whether the motor has failed. Such failure determination can also be implemented in the circuitry of circuit 100 and signaled by suitable means including by an additional correction to the chip.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A single-chip integrated controller for controlling a DC motor having permanent magnet rotor driven by a pair of coils, the integrated controller comprising:

a magnetic field sensing device that detects a relative position of the rotor magnet of the DC motor;

a drive circuit, coupled to the sensing device, configured to control the voltage provided to the coils based on the output of the sensing device, said drive circuit having two output terminals for connecting to the coils and a ground terminal for connecting to ground; and a voltage regulator coupled to the sensing device and the drive circuit, for supplying a stabilized voltage to the sensing device;

wherein the drive circuit controls the voltage at the output terminals so as to operate the coils in anti-phase and so as to rotate the rotor, and wherein the drive circuit operates to electrically couple and discouple in anti-phase each output terminal with the voltage regulator, wherein the drive circuit each output terminal with the voltage regulator when the voltage at the respective terminal is high, and such that the voltage regulator is able to supply a stabilized voltage to the sensing device and the drive circuit.

2. The integrated controller of claim 21, wherein the sensing device includes a Hall plate coupled to an amplifier circuit.

3. The integrated controller of claim 21, wherein the drive circuit includes:

first and second power transistors for driving the motor coils, wherein an output terminal of each power transistor is coupled to one of the motor coils.

4. The integrated controller of claim 3, wherein the drive circuit further includes:

a control circuit configured to control the power transistors to switch on and off in anti-phase based on the output of the sensing device; and a switching circuit coupled to the control circuit and to the power transistors and coupling the voltage regulator to the output terminals.

5. The integrated controller of claim 4, wherein the control circuit is configured to switch the power transistors on and off such that there is always one respective output terminal of the power transistors for which the voltage is high.

6. The integrated controller of claim 4, wherein the control circuit controls the switching circuit to connect each of the output terminals to the voltage regulator when the voltage at the respective output terminal is high.

7. The integrated controller of claim 1, wherein the integrated controller is implemented in a package having only three electrical connection elements, wherein two of the elements are coupled to the output terminals of the drive circuit and wherein the third element is coupled to the ground terminal.

8. An integrated controller system for controlling a DC motor having a permanent magnet rotor driven by a pair of coils, the integrated controller comprising:

a magnetic field sensing means for detecting a relative position of the rotor magnet of the DC motor.

a control means, coupled to the sensing means, for controlling the voltage provided to the coils based on the output of the sensing means, said control means having two output terminals for connecting to the coils and a ground terminal for connecting to ground, and a voltage regulator coupled to the sensing means and the control means, for supplying a stabilized voltage to the sensing means;

wherein in operation the control means controls the voltage at the output terminals so as to operate the coils in anti-phase and so as to rotate the rotor, and wherein the control means operates to electrically couple and discouple in anti-phase each output terminal with the voltage regulator, wherein the control means couples each output terminal with the voltage regulator when the voltage at the respective output terminal is high, and such that the voltage regulator is able to supply a stabilized voltage to the sensing means and the control means.

9. The system of claim 8, wherein, the system is integrated on a single chip.

10. The system of claim 9, wherein the chip is a CMOS chip.

11. The system of claim 9, wherein the chip is mounted on the motor such that the connections between the output terminals and the coils are inaccessible to external contact.

12. The system of claim 8, wherein the sensing means includes a Hall plate coupled to an amplifier circuit.

13. The system of claim 8, wherein the control means includes:

first and second power transistors for driving the motor coils, wherein an output terminal of each power transistor is coupled to one of the motor coils.

14. The system of claim 13, wherein the control means further includes:

power transistor control means configured to control the power transistors to switch on and off in anti-phase based on the output of the sensing means; and switching means coupled to the power transistor control means and to the power transistors and for coupling the voltage regulator to the output terminals.

15. The system of claim 14, wherein the power transistor control means includes circuitry configured to switch the power transistors on and off such that there is always one respective output terminal of the power transistors for which the voltage is high.

16. The system of claim 14, wherein the power transistor control means includes circuitry configured to control the switching means to connect each of the output terminals to the voltage regulator when the voltage at the respective output terminal is high.

17. A single-chip integrated controller for controlling a DC motor having a permanent magnet rotor driven by a pair of coils, the integrated controller comprising:

a magnetic field sensing device that detects a relative position of the rotor magnet of the DC motor;

a drive circuit, coupled to the sensing device, configured to control the voltage provided to the coils based on the output of the sensing device, said drive circuit having two output terminals for connecting to the coils and a ground terminal for connecting to ground; and a voltage regulator coupled to the sensing device and the drive circuit, for supplying a stabilized voltage to the sensing device;

wherein said drive circuit further includes;

fist and second power transistors for driving the motor coils, wherein an output terminal of each power transistor is coupled to one of the motor coils, a control circuit configured to control the power transistors to switch on and off in anti-phase based on the output of the sensing device; and a switching circuit coupled to the control circuit and to the power transistors and coupling the voltage regulator to the output terminals, wherein the control circuit is configured to switch the power transistors on and off such that there is always one respective output terminal of the power transistors for which the voltage is high;

wherein the control circuit controls the voltage at the output terminals so as to operate the coils in anti-phase and so as to rotate the rotor, wherein the switching circuit connects and disconnects in anti-phase each output terminal with the voltage regulator such that the voltage regulator supplies a stabilized voltage to the sensing device and the drive circuit.

18. A single-chip integrated controller for controlling a DC motor having a permanent magnet rotor driven by a pair of coils, the integrated controller comprising:

a magnetic field sensing device that detects a relative position of the rotor magnet of the DC motor;

a drive circuit, coupled to the sensing device, configured to control the voltage provided to the coils based on the output of the sensing device, said drive circuit having two output terminals for connecting to the coils and a ground terminal for connecting to ground; and a voltage regulator coupled to the sensing device and the drive circuit, for supplying a stabilized voltage to the sensing device, wherein said drive circuit further includes:

first and second power transistors for driving the motor coils, wherein an output terminal of each power transistor is coupled to one of the motor coils, a control circuit configured to control the power transistors to switch on and off in anti-phase based on the output of the sensing device; and a switching circuit coupled to the control circuit and to the power transistors and coupling the voltage regulator to the output terminals, wherein the control circuit controls the switching circuit to connect each ot the output terminals to the voltage regulator when the voltage at the respective output terminal is high;

wherein the control circuit controls the voltage at the output terminals so as to operate the coils in anti-phase and so as to rotate the rotor, and wherein the switching circuit connects and disconnects in anti-phase each output terminal with the voltage regulator such that the voltage regulator supplies a stabilized voltage to the sensing device and the drive circuit.

19. An integrated controller system for controlling a DC motor having a permanent magnet rotor driven by a pair of coils, the integrated controller system comprising:

a magnetic field sensing means for detecting a relative position of the rotor magnet of the DC motor;

a control means, coupled to the sensing means, for controlling the voltage provided to the coils based on the output of the sensing means, said control means having two output terminals for connecting to the coils and a ground terminal for connecting to ground; and a voltage regulator coupled to the sensing means and the control means, for supplying a stabilized voltage to the sensing means;

wherein said control means further includes:

first and second power transistors for driving the motor coils, wherein an output terminal of each power transistor is coupled to one of the motor coils;

power transistor control means configured to control the power transistors to switch on and off in anti-phase based on the output of the sensing means; and switching means coupled to the power transistor control means and to the power transistors for coupling the voltage regulator to the output terminals, wherein the power transistor control means includes circuitry configured to switch the power transistors on and off such that there is always one respective output terminal of the power transistors for which the voltage is high;

wherein in operation the power transistor control means controls the voltage at the output terminals so as to operate the coils in anti-phase and so as to rotate the rotor, and wherein the switching means connects and disconnects in anti-phase each output terminal with the voltage regulator such that the voltage regulator supplies a stabilized voltage to the sensing means and the control means.

20. An integrated controller system for controlling a DC motor having a permanent magnet rotor driven by a pair of coils, the integrated controller system comprising:

a magnetic field sensing means for detecting a relative position of the rotor magnet of the DC motor;

a control means, coupled to the sensing means, for controlling the voltage provided to the coils based on the output of the sensing means, said control means having two output terminals for connecting to the coils and a ground terminal for connecting to ground; and a voltage regulator coupled to the sensing means and the control means, for supplying a stabilized voltage to the sensing means;

wherein said control means further includes:

first and second power transistors for driving the motor coils, wherein an output terminal of each power transistor is coupled to one of the motor coils;

power transistor control means configured to control the power transistors to switch on and off in anti-phase based on the output of the sensing means; and switching means for coupled to the power transistor control means and to the power transistors for coupling the voltage regulator with the output terminals, wherein the power transistor control means includes circuitry configured to control the switching means to couple each of the output terminals with the voltage regulator when the voltage at the respective output terminal is high;

wherein in operation the power transistor control means controls the voltage at the output terminals so as to operate the coils in anti-phase and so as to rotate the rotor, and wherein the switching means couples and discouples in anti-phase each output terminal with the voltage regulator such that the voltage regulator supplies a stabilized voltage to the sensing means and the control means.

21. A single-chip integrated controller for controlling a DC motor having a permanent magnet rotor driven by a pair of coils, the integrated controller comprising:

a magnetic field sensing device that detects a relative position to the rotor magnet of the DC motor;

a drive circuit, coupled to the sensing device, configured to control the voltage provided to the coils based on the output of the sensing device, said drive circuit having first and second power transistors for driving the motor coils, wherein an output terminal of each power transistor is coupled to one of the motor coils, the drive circuit further including a ground terminal for connecting to ground; and a voltage regulator coupled to the sensing device and the drive circuit, for supplying a stabilized voltage to the sensing device;

wherein the drive circuit controls the voltage at the output terminals so as to operate the coils in anti-phase and so as to rotate the rotor, and wherein the drive circuit operates to electrically couple and discouple in anti-phase each output terminal with the voltage regulator, wherein the drive circuit couples each output terminal with the voltage regulator when the respective output transistor is switched off, and such that the voltage regulator is able to supply a stabilized voltage to the sensing device and the drive circuit.

* * * * *

UNITED STATES PATENT AND TRADEMARK OFFICE
CERTIFICATE OF CORRECTION

PATENT NO. : 6,724,163 B2
DATED : April 20, 2004
INVENTOR(S) : De Winter et al.

It is certified that error appears in the above-identified patent and that said Letters Patent is hereby corrected as shown below:

Column 5,
Line 20, add -- a -- after "having".
Line 37, after "circuit" insert -- couples --.
Lines 42 and 45, delete "21" and insert therefor -- 1 --.

Column 6,
Line 11, delete "motor." and insert -- motor; --.
Line 30, delete "wherein," and insert therefor -- wherein --.

Column 7,
Line 42, delete "device," and insert therefor -- device; --.
Line 54, delete "ot" and insert therefor -- of --.

Signed and Sealed this

Twenty-fifth Day of October, 2005

JON W. DUDAS
*Director of the United States Patent and Trademark Office*